(12) United States Patent
Ikeno

(10) Patent No.: US 8,606,902 B2
(45) Date of Patent: Dec. 10, 2013

(54) DEVICE MANAGEMENT APPARATUS, DEVICE MANAGEMENT SYSTEM, DEVICE MANAGEMENT METHOD AND MEDIUM

(75) Inventor: Hideo Ikeno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 12/190,549

(22) Filed: Aug. 12, 2008

(65) Prior Publication Data
US 2009/0063663 A1 Mar. 5, 2009

(30) Foreign Application Priority Data

Aug. 31, 2007 (JP) ................................ 2007-226697

(51) Int. Cl.
*G06F 15/173* (2006.01)
(52) U.S. Cl.
USPC .......................... 709/224; 709/223; 709/226
(58) Field of Classification Search
USPC ...................... 709/205, 220, 223, 224; 718/1
See application file for complete search history.

(56) References Cited

U.S. PATENT DOCUMENTS

| | | | | |
|---|---|---|---|---|
| 2002/0144162 A1* | 10/2002 | Tada et al. | ..................... | 713/300 |
| 2003/0009760 A1* | 1/2003 | Sakamoto et al. | ............. | 725/74 |
| 2004/0061885 A1 | 4/2004 | Ikeno | | |
| 2004/0098526 A1* | 5/2004 | Matsumoto et al. | .......... | 710/240 |
| 2004/0163130 A1* | 8/2004 | Gray et al. | ..................... | 725/132 |
| 2004/0172469 A1* | 9/2004 | Takahashi et al. | ............. | 709/224 |
| 2007/0088779 A1* | 4/2007 | Kagaya | .......................... | 709/203 |

FOREIGN PATENT DOCUMENTS

| JP | 2003-150469 | 5/2003 |
|---|---|---|
| JP | 2007-025948 A | 2/2007 |

OTHER PUBLICATIONS

Office Action dated Jan. 6, 2012, concerning Japanese Patent Application No. 2007-226697.

* cited by examiner

*Primary Examiner* — Brian J Gillis
(74) *Attorney, Agent, or Firm* — Fitzpatrick, Cella, Harper & Scinto

(57) ABSTRACT

The present invention in its first aspect provides a device management apparatus, which manages a virtual device that implements a cooperative function upon cooperating a plurality of physical devices connected via a network, comprising an acquisition unit adapted to acquire statuses from the physical devices that implement the cooperative function of the virtual device; and a display unit adapted to display whether or not the virtual device is usable, based on the statuses of the physical devices that implement the cooperative function of the virtual device acquired by the acquisition unit.

14 Claims, 16 Drawing Sheets

| DEVICE LIST | | | |
|---|---|---|---|
| | DEVICE NAME | STATUS | COOPERATION |
| | 103 | JAM | - |
| | 104 | Toner Empty | - |
| | 105 | Reader ABNORMALITY /Toner Empty | - |
| | 106 | NORMAL | - |
| | 107 | NORMAL | - |
| | VD1 | NORMAL | 103+104 |
| | VD2 | NORMAL | 103+106 |
| | VD3 | Toner Empty | 103+104 |
| | VD4 | NORMAL | 103+106 |
| | VD5 | UNUSABLE (Scan DISABLED/PRINT DISABLED) | 103+105 |
| | VD6 | NORMAL | 103+107 |

FIG. 6

| VIRTUAL DEVICE \ FUNCTION | SCAN | MONOCHROME PRINT | COLOR PRINT | FAX SEND | FAX RECEPTION | BOX SAVE |
|---|---|---|---|---|---|---|
| | | | PHYSICAL DEVICE TO PROCESS | | | |
| VD1 | 104 | - | - | 103 | - | - |
| VD2 | - | 106 | - | - | 103 | - |
| VD3 | 103 | - | 104 | - | - | - |
| VD4 | 103 | - | 106 | - | - | - |
| VD5 | 105 | - | - | - | - | 103 |
| VD6 | 107 | - | - | - | - | 103 |

FIG. 7

| FUNCTION | STATUS THAT INFLUENCES FUNCTION |
|---|---|
| SCAN | reader ABNORMALITY |
| MONOCHROME PRINT | jam |
| COLOR PRINT | toner empty |
| | door open |
| | sorter/finisher ABNORMALITY |
| FAX SEND | Fax-UNSENDABLE |
| FAX RECEPTION | Fax-memory full |
| BOX SAVE | controller-disk full |
| | controller-HD error |
| | memory-File COUNT over |

FIG. 8

| CASE | PHYSICAL DEVICE | STATUS | FUNCTION | | | | | | DETERMINATION |
|---|---|---|---|---|---|---|---|---|---|
| | | | SCAN | MONOCHROME PRINT | COLOR PRINT | Fax SEND | Fax RECEPTION | Box SAVE | |
| | | PROCESSING DEVICE / INFLUENCE STATE | 104 | – | – | 103 | – | – | |
| CASE 1 | 103 | NORMAL | | | | | | | ○ |
| | 104 | toner empty | | × | × | | | | |
| CASE 2 | 103 | reader empty | × | | | | | | ○ |
| | 104 | jam | | × | × | | | | |
| CASE 3 | 103 | Fax-UNSENDABLE | | | | × | | | × |
| | 104 | door open | | × | × | | | | |
| CASE 4 | 103 | NORMAL | | | | | | | × |
| | 104 | reader ABNORMALITY | × | | | | | | |

FIG. 11
DEVICE LIST
| | DEVICE NAME | STATUS | COOPERATION |
|---|---|---|---|
|  | 103 | JAM | - |
|  | 104 | Toner Empty | - |
|  | 105 | Reader ABNORMALITY /Toner Empty | - |
|  | 106 | NORMAL | - |
|  | 107 | NORMAL | - |
|  | VD1 | NORMAL | 103+104 |
|  | VD2 | NORMAL | 103+106 |
|  | VD3 | Toner Empty | 103+104 |
|  | VD4 | NORMAL | 103+106 |
|  | VD5 | UNUSABLE (Scan DISABLED/PRINT DISABLED) | 103+105 |
|  | VD6 | NORMAL | 103+107 |

<DEVICE MANAGEMENT APPARATUS>

<DEVICE>

FIG. 15

| UNUSABLE HARDWARE |
|---|
| MAIN BODY |
| SCANNER UNIT |
| PRINTER MAIN BODY |
| UNUSABLE FUNCTION |
| FUNCTION OF TOKEN BOARD |
| FUNCTION OF RESOLUTION CONVERSION BOARD |
| FUNCTION OF FAX BOARD 1 |
| FUNCTION OF FAX BOARD 2 |

FIG. 16

| FUNCTION | DEGENERACY INFORMATION THAT INFLUENCES FUNCTION |
|---|---|
| SCAN | SCANNER UNIT |
| MONOCHROME PRINT | PRINTER MAIN BODY |
| COLOR PRINT | |
| Fax SEND | FUNCTION OF FAX BOARD 1 |
| Fax RECEPTION | FUNCTION OF FAX BOARD 2 |
| Box SAVE | FUNCTION OF RESOLUTION CONVERSION BOARD |

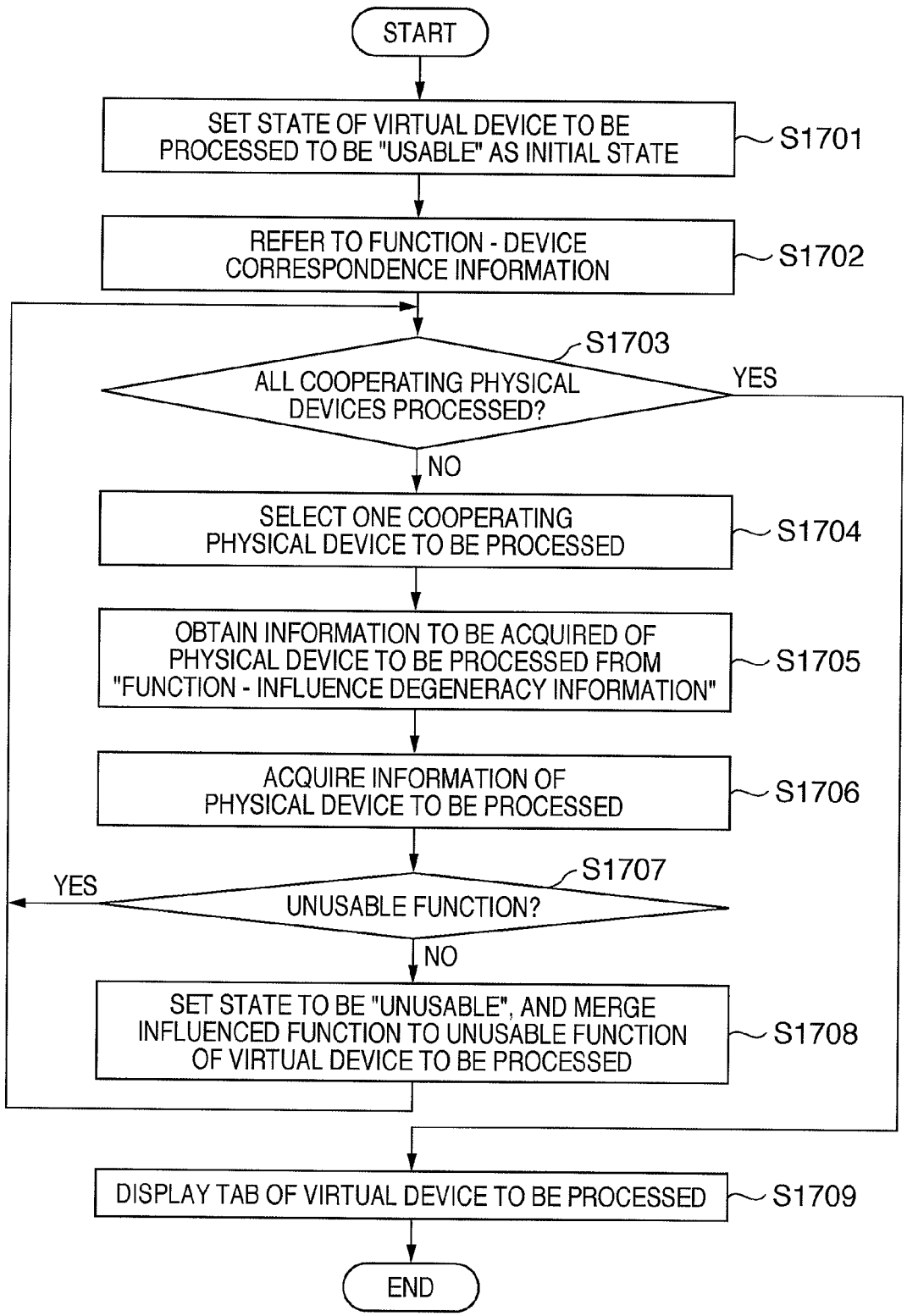

DEVICE MANAGEMENT APPARATUS, DEVICE MANAGEMENT SYSTEM, DEVICE MANAGEMENT METHOD AND MEDIUM

BACKGROUND OF THE INVENTION

1. Field of the Invention

The present invention relates to a device management apparatus which manages a virtual device, a device management system, a device management method and a medium.

2. Description of the Related Art

A technique that assigns devices to respective functions on a network and causes these devices to cooperate to implement FAX and remote copy functions as one device is available. This technique handles a plurality of cooperating devices as one device called a "virtual device". Contrary to the virtual device, each physical device will be referred to as a "physical device" hereinafter. Japanese Patent Laid-Open No. 2003-150469 describes a method of displaying all physical devices, indicating their cooperating states by arrows, and displaying the states of respective physical devices as icons upon displaying the state of a virtual device. In this case, the states of the physical devices are determined based only on whether each physical device is abnormal or normal.

Therefore, conventionally, the virtual device user needs to determine whether or not the physical devices can be used as a virtual device by determining upon checking the states of the cooperating physical devices if all the physical devices are normal or any of the physical devices is abnormal. The state of the physical device indicates that of a physical device alone. In this case, the state of each physical device is displayed in detail like "jam", "reader abnormality", and so forth. In such case, the virtual device user needs to determine up to which of physical devices in a virtual device has charge of which function, and whether or not the states of the physical devices can implement that function.

Only a user well-informed about the configuration of the virtual device and the relationship between the physical device states and functions can make such determination. For this reason, when one of the physical devices that configure the virtual device indicates an abnormal state, a normal user determines that the virtual device is unusable.

SUMMARY OF THE INVENTION

The present invention provides a device management apparatus which allows the user to easily recognize the state of a virtual device.

The present invention in its first aspect provides a device management apparatus, which manages a virtual device that implements a cooperative function upon cooperating a plurality of physical devices connected via a network, comprising: an acquisition unit adapted to acquire statuses from the physical devices that implement the cooperative function of the virtual device; and a display unit adapted to display whether or not the virtual device is usable, based on the statuses of the physical devices that implement the cooperative function of the virtual device acquired by the acquisition unit.

The present invention in its second aspect provides a device management method, which manages a virtual device that implements a cooperative function upon cooperating a plurality of physical devices connected via a network, comprising: an acquisition step of acquiring statuses from the physical devices that implement the cooperative function of the virtual device; and a display step of displaying whether or not the virtual device is usable, based on the statuses of the physical devices that implement the cooperative function of the virtual device acquired in the step of acquiring.

The present invention in its third aspect provides a computer-readable medium storing a device management program executed by a device management apparatus, which manages a virtual device that implements a cooperative function upon cooperating a plurality of physical devices connected via a network, the device management program making the device management apparatus function to: acquire statuses from the physical devices that implement the cooperative function of the virtual device; and display whether or not the virtual device is usable, based on the acquired statuses of the physical devices that implement the cooperative function of the virtual device.

According to the present invention, the user can easily recognize the state of a virtual device.

Further features of the present invention will become apparent from the following description of exemplary embodiments with reference to the attached drawings.

BRIEF DESCRIPTION OF THE DRAWINGS

FIG. 6 is a table showing the correspondence between the virtual devices and physical devices;

FIG. 7 is a table showing the correspondence between the functions of the virtual devices and abnormal statuses shown by the physical devices;

FIG. 8 is a table for explaining status determination processing of the virtual device;

FIG. 11 shows an example of a device list window displayed on a display unit of the device management apparatus;

FIG. 15 is a table showing an example of degeneracy information in the embodiment of the present invention;

FIG. 16 is a table showing the correspondence between the functions of the virtual devices and degeneracy information of physical devices; and FIG. 17 is a flowchart showing the sequence of state determination processing and display unit control processing of a virtual device according to the fourth embodiment.

DESCRIPTION OF THE EMBODIMENTS

Figure 1:
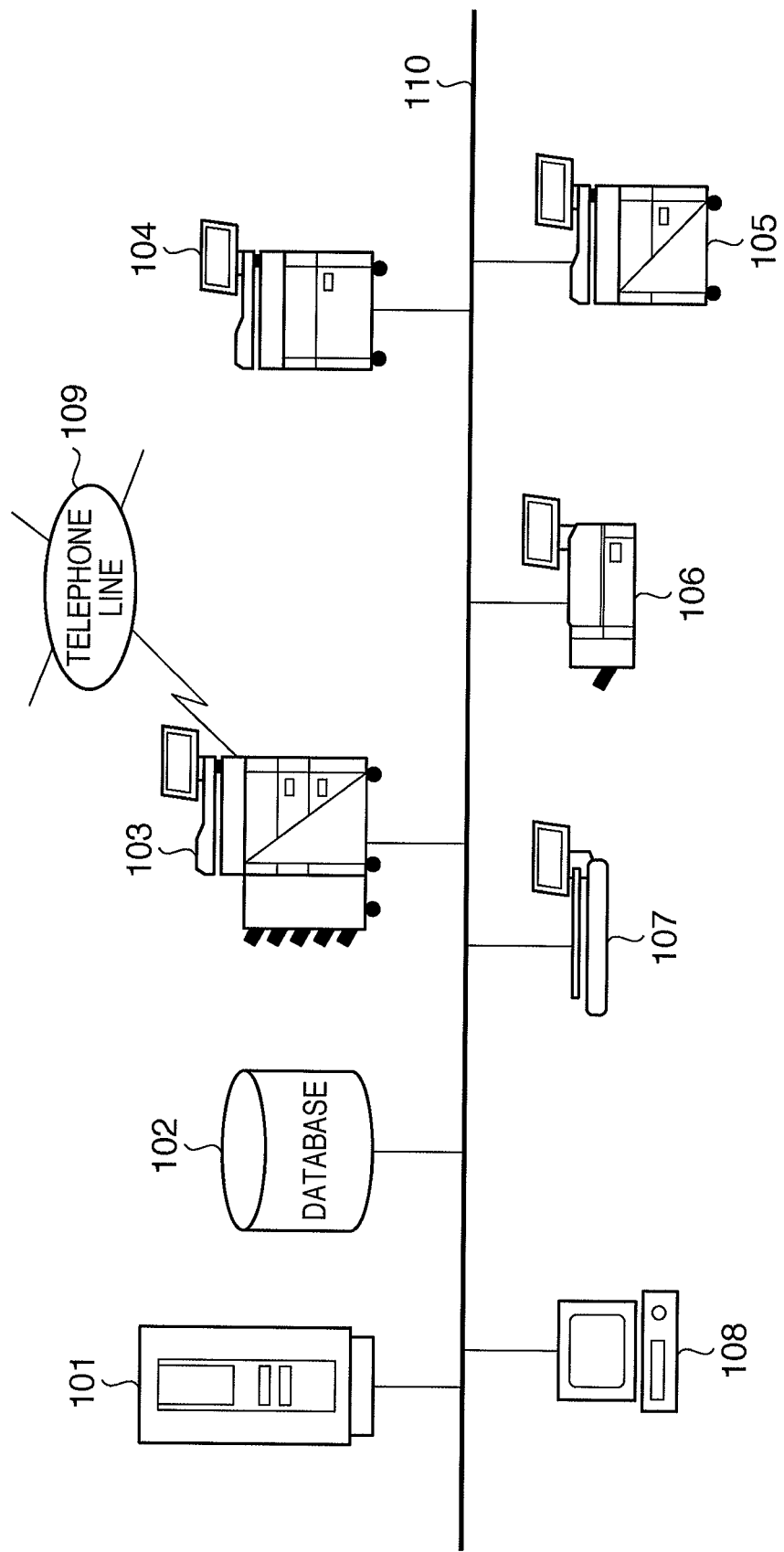
FIG. 1 is an overall system diagram showing a device management system according to an embodiment of the present invention.

The best mode of carrying out the present invention will be described in detail hereinafter with reference to the drawings. Note that the same reference numerals denote the same components and a repetitive description thereof will be avoided.

FIG. 1 is an overall system diagram showing a device management system according to an embodiment of the present invention. A device management apparatus 101 plays the role of managing devices as a server in this embodiment. On the device management apparatus 101, a device management program according to the present invention can run. The device management apparatus 101 stores various data associated with device management in a database 102. FIG. 1 illustrates the device management apparatus 101 and database 102 as independent apparatuses. However, the database 102 may be physically included in the device management apparatus 101.

Devices 103, 104, 105, 106, and 107 are those to be managed by the device management apparatus 101. The device 103 is a central multi-function peripheral (MFP) which integrally has copy and print, scanner, and facsimile functions, and plays multiple roles in this embodiment. In this embodiment, the device 103 has an arrangement including a color scanner and monochrome high-speed copying machine, and can exchange FAX data by connecting a telephone line 109. The device 104 is a color MFP having color copy and print, and color scanner functions. The device 105 is a monochrome MFP having monochrome copy and print, and monochrome scanner functions. The device 106 is a color printer which receives data from an information processing apparatus such as a personal computer (PC) or the like, and executes a color print operation. The device 107 is a color scanner.

The device management apparatus 101, database 102, devices 103 to 107, and a PC 108 are connected to a network 110, and can exchange data with each other (including a one-way communication). The PC 108 can transmit print image data to or can receive scan image data from the devices 103 to 107 directly or via the device management apparatus 101.

In this embodiment, the device management apparatus 101 and database 102 are allocated on the same network as the devices 103 to 107 and PC 108. Note that the device management apparatus 101 and database 102 may be allocated on a different network, and may be connected from respective devices via the Internet. In this case, for example, respective devices may exchange data and the like using an HTTP or SOAP protocol or the like.

Figure 2:
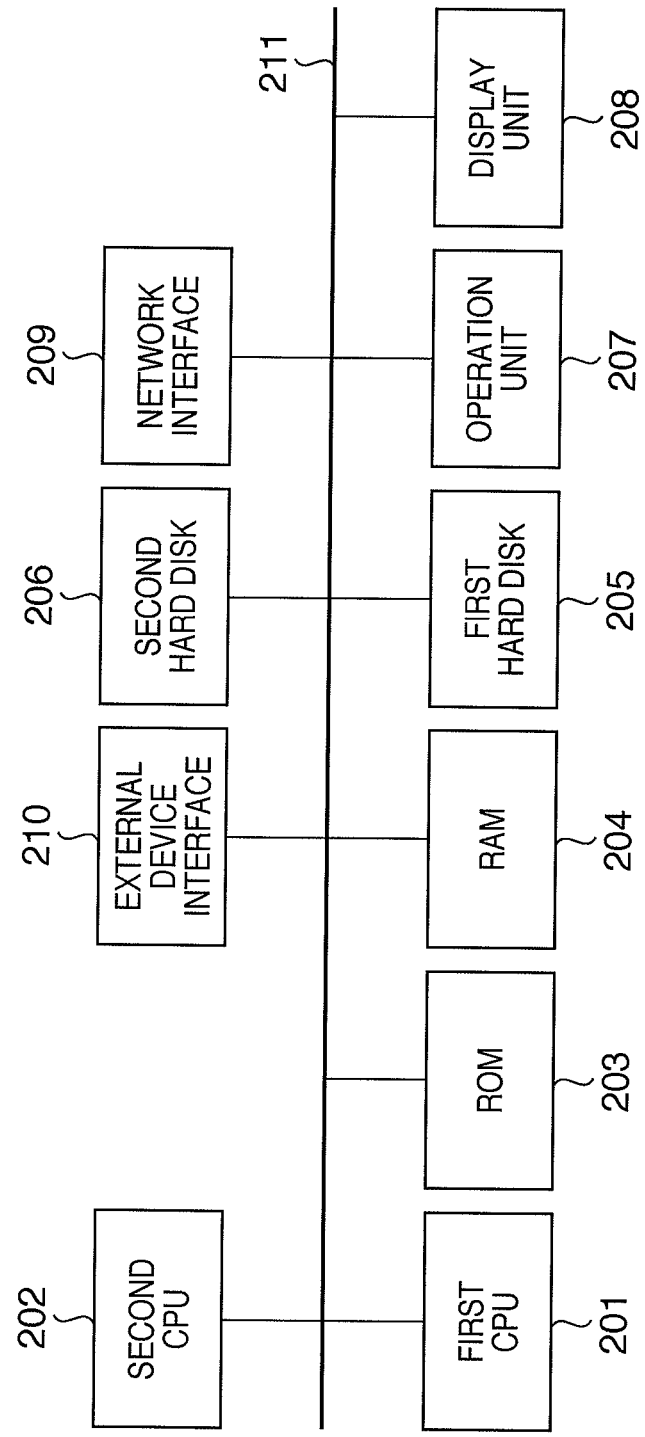
FIG. 2 is a block diagram showing the hardware arrangement of a device management apparatus.

FIG. 2 is a block diagram showing the hardware arrangement of the device management apparatus. In the device management apparatus 101, a first CPU 201 and second CPU 202 control respective processes on the apparatus, and a ROM 203 stores programs and data associated with respective processes of this apparatus. A RAM 204 electrically stores temporary data associated with respective processes of this apparatus. A first hard disk 205 and second hard disk 206 store programs, data, and temporary data associated with respective processes of this apparatus, and information and the like acquired from respective devices of this embodiment. An operation unit 207 is an input device, which includes, for example, a keyboard and pointing device that accept instruction inputs to this apparatus. A display unit 208 displays the operation state of this apparatus, and information output from programs which run on this apparatus. A network interface 209 connects a LAN and the Internet via a network to exchange information with external devices. An external device interface 210 connects, for example, an external storage device or the like. A system bus 211 connects the respective units shown in FIG. 2 to make data communications. In FIG. 2, the first and second CPUs 201 and 202 may be combined into one CPU, and the first and second hard disks 205 and 206 may be combined into one hard disk.

Figure 3:
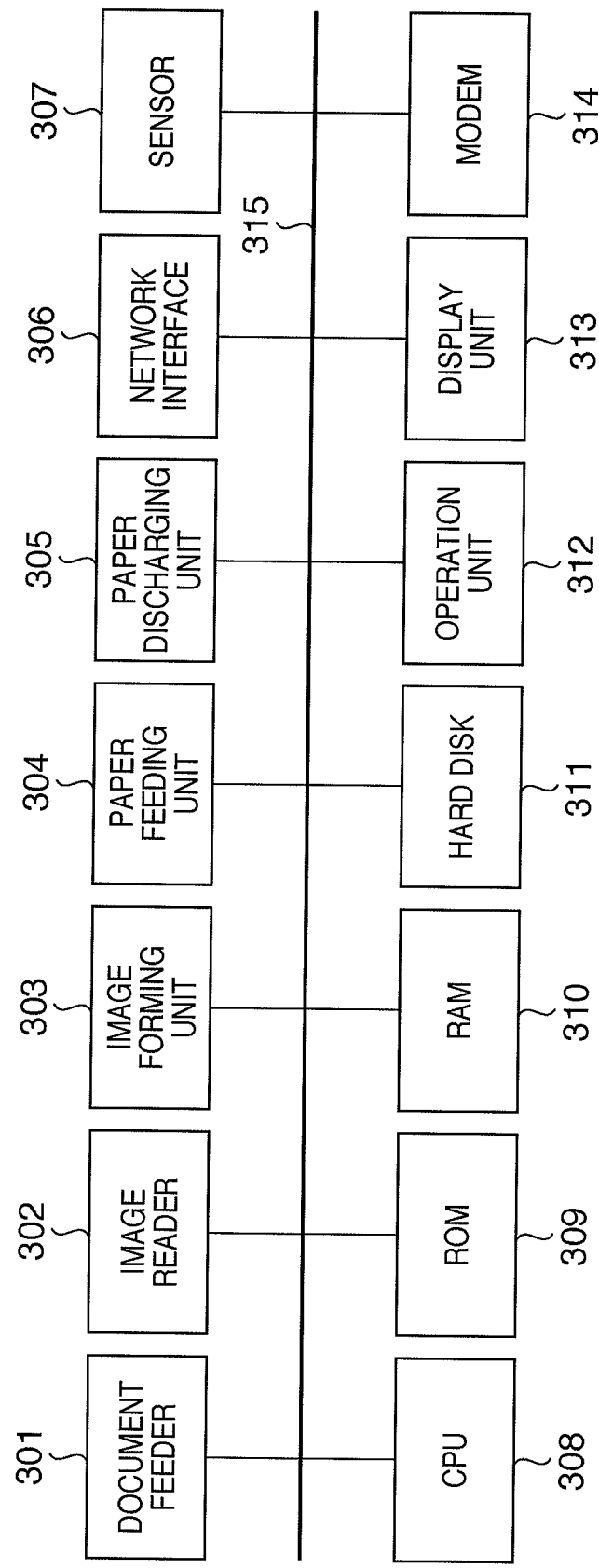
FIG. 3 is a block diagram showing the hardware arrangement of a device.

FIG. 3 is a block diagram showing the hardware arrangement of the device. FIG. 3 shows, for example, the hardware arrangement of the device 103 as the central MFP. A document feeder 301 automatically feeds a document to be read to an image reader 302. In this embodiment, the image reader 302 indicates, for example, a scanner. The image reader 302 reads a document image, and an image forming unit 303 converts or prints the read document image and received data into print images. A paper feeding unit 304 feeds print sheets. A paper discharging unit 305 discharges printed sheets, and applies processes such as sorting, stapling, and the like to the discharged sheets. A network interface 306 connects a LAN and the Internet via the network and communicates with external devices. A sensor 307 is, for example, a convey sensor or the like, and can detect the states of respective units of this device. A CPU 308 controls respective processes on this device. A ROM 309 stores programs and data associated with respective processes of this device. A RAM 310 electrically stores temporary data associated with respective processes of this device. A hard disk 311 stores programs and data or temporary data associated with respective processes of this device, and user data and the like sent to this device. An operation unit 312 accepts instructions input to this device. A display unit 313 displays the operation state of this device, and information associated with operations with respect to the operation unit 312 to the user. A modem 314 connects a telephone line. A system bus 315 connects the respective units shown in FIG. 3 to make data communications.

In case of the device 103 as the central MFP, in the arrangement shown in FIG. 3, the image reader 302 supports color data, and the image forming unit 303 processes that data as monochrome data. The hard disk 311 stores a program for converting print data into PDF data. Furthermore, files generated by the PDF conversion program can be saved in the hard disk 311 to have a hierarchical structure by, for example, a general BOX save function.

The device 104 as the color MFP can be arranged by excluding the modem 314 from the arrangement in FIG. 3. Also, the image reader 302 and image forming unit 303 support color data.

The device 105 as the monochrome MFP can be arranged by excluding the modem 314 from the arrangement in FIG. 3. Also, the image reader 302 and image forming unit 303 support only monochrome data.

The device 106 as the color printer can be arranged by excluding the document feeder 301, image reader 302, and modem 314 from the arrangement in FIG. 3. The image reader 302 and image forming unit 303 support color data. The device 107 as the color scanner can be arranged by excluding the document feeder 301, paper feeding unit 304, paper discharging unit 305, hard disk 311, and modem 314 from the arrangement in FIG. 3. The image reader 302 and image forming unit 303 support color data.

In the system shown in FIG. 1, one process can be implemented by cooperating the functions of the devices 103 to 107. A device implemented by cooperating such plurality of devices as one device will be called a "virtual device".

Figure 4A:
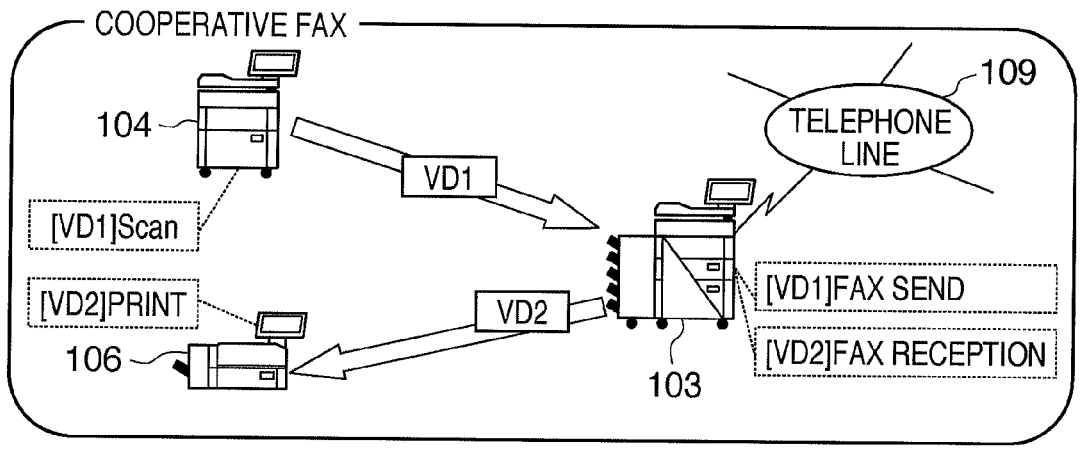
FIGS. 4A to 4C are views showing examples of the configurations of virtual devices.
Figure 4B:
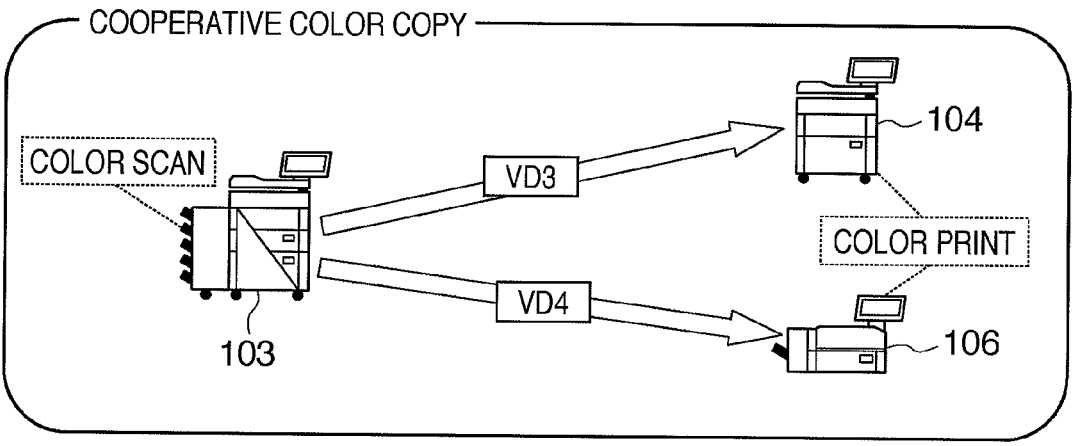
Figure 4C:
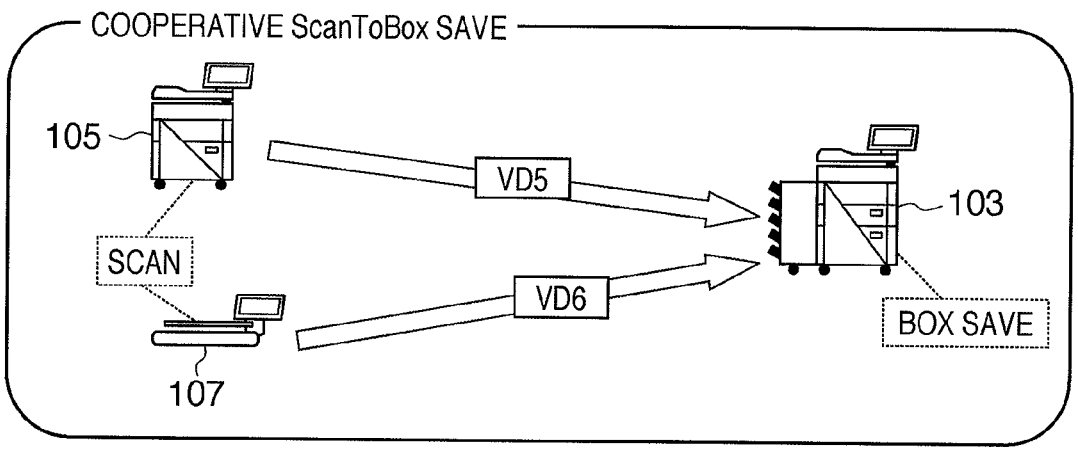

FIGS. 4A to 4C show examples of the configurations of virtual devices. FIG. 4A shows an example of virtual devices which implement a cooperative FAX function. A virtual device VD1 can send an image scanned by the device 104 as the color MFP using the FAX function of the device 103 as the central MFP by cooperation of the devices 104 and 103, as indicated by an arrow. A virtual device VD2 can print FAX data received by the device 103 as the central MFP using the device 106 as the color printer by cooperation of the devices 103 and 106, as indicated by an arrow.

FIG. 4B shows an example of virtual devices which implement a cooperative color copy function. A virtual device VD3 can print an image scanned by the device 103 as the central MFP using the device 104 as the color MFP by cooperation of the devices 103 and 104, as indicated by an arrow. A virtual device VD4 can print an image scanned by the device 103 as the central MFP using the device 106 as the color printer by cooperation of the devices 103 and 106, as indicated by an arrow.

FIG. 4C shows an example of virtual devices which implement a cooperative ScanToBox save function. That is, FIG. 4C shows an example of virtual devices which save scanned data in a BOX. A virtual device VD5 cooperates the device 105 as the monochrome MFP and the device 103 as the central MFP, as indicated by an arrow. With this cooperation, an image scanned by the device 105 as the monochrome MFP can be converted into a PDF file by the PDF conversion program of the device 103 as the central MFP, and that PDF file can be saved in the hard disk 311 using the BOX save function of the device 103. A virtual device VD6 cooperates the device 107 as the color scanner and the device 103 as the central MFP, as indicated by an arrow. With this cooperation, an image scanned by the device 107 can be converted into a PDF file by the PDF conversion program of the device 103, and that PDF file can be saved in the hard disk 311 using the BOX save function of the device 103.

Figure 5:
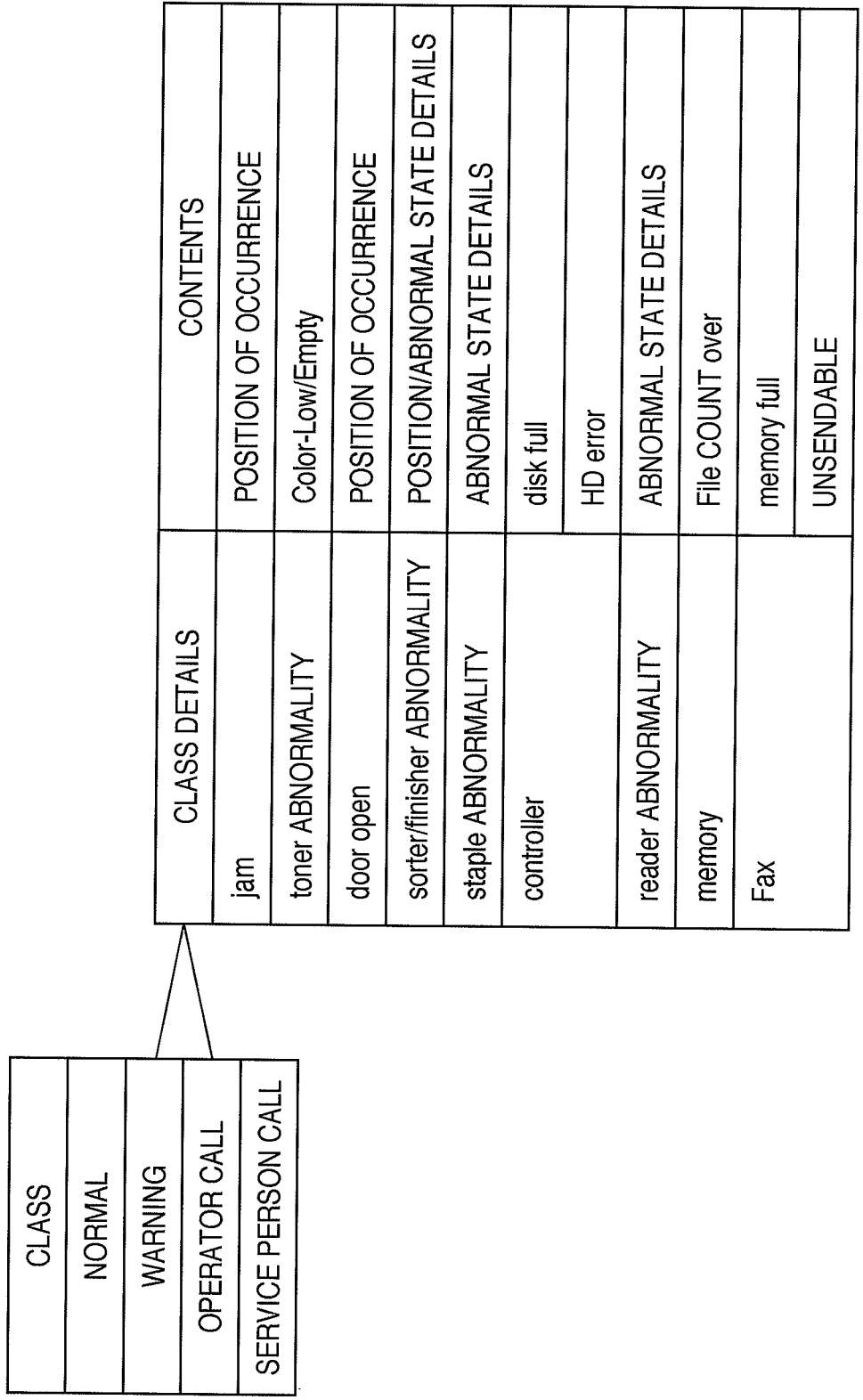
FIG. 5 shows status information of a device.

FIG. 5 shows status information of the devices 103 to 107 shown in FIG. 1. In this embodiment, each device has four classes of status information, that is, "normal", "warning", "operator call", and "service person call", as shown in FIG. 5. Note that the classes are defined by classifying the state of the device into four classes depending on the levels of abnormality. Status information classified to the "normal" class indicates that the device of interest operates in a normal state. Status information classified to the "service person call" class indicates a state in which the device suspends, and all the functions of the device are disabled until a special service person repairs the device. This embodiment covers status information classified to "warning" and "operator call". As for the status information covered by this embodiment, even when a content indicated by that status has occurred, only some functions of the physical device are disabled, and other functions are usable. The "warning" and "operator call" classes are further classified into classes shown in "class details". "Contents" in FIG. 5 indicate the contents of respective warnings and the like shown in "class details".

For example, the content of "jam" in a field of "class details" indicates the position of occurrence of "jam" (paper jam). Also, the content of "FAX" in a field of "class details" indicates an unreceivable state "memory full", and a FAX unsendable state "unsendable" due to line trouble or the like.

FIG. 6 shows the correspondence between the virtual devices and physical devices. In this embodiment, "function—device correspondence information" shown in FIG. 6 is also called first correspondence information. This information is created by virtual device creation processing executed by the user at the device management apparatus 101, and is stored and held in, for example, the database 102 (first holding unit). Note that this information may be created when the device management apparatus 101 automatically defines virtual devices by appropriately combining devices detected on the network 110. Also, this information may be stored in a storage device such as the first hard disk 205 or the like in the device management apparatus 101.

As shown in FIG. 6, virtual devices are shown in the column direction. Functions of the virtual devices are shown in the row direction. At an intersection between each virtual device and the function of that virtual device, the physical device that has charge of that function is shown.

For example, as shown in FIG. 6, in the virtual device VD1, the device 104 as the color MFP has charge of the scan function, and the device 103 as the central MFP has charge of the FAX send function. Likewise, in the virtual device VD2, the device 106 as the color printer has charge of the monochrome print function, and the device 103 as the central MFP has charge of the FAX reception function. Since the monochrome print function is the FAX print function using monochrome data, the monochrome print function is assigned.

Also, as shown in FIG. 6, in the virtual device VD3, the device 103 as the central MFP has charge of the scan function, and the device 104 as the color MFP has charge of the color print function. In the virtual device VD4, the device 103 as the central MFP has charge of the scan function, and the device 106 as the printer has charge of the color print function. Furthermore, in the virtual device VD5, the device 105 as the monochrome MFP has charge of the scan function, and the device 103 as the central MFP has charge of the BOX save function. In the virtual device VD6, the device 107 as the scanner has charge of the scan function, and the device 103 as the central MFP has charge of the BOX save function.

FIG. 7 shows the correspondence between the functions of the virtual devices and the abnormal statuses shown by the physical devices. In this embodiment, "function—status correspondence information" shown in FIG. 7 is also called second correspondence information. In this embodiment, the second correspondence information is stored and held in storage areas of the RAMs or the like of the device management apparatus 101 or the devices 103 to 107 (second holding unit). FIG. 7 shows the correspondence between the abnormal statuses shown by the physical devices and the functions of the virtual devices which are influenced by these abnormal statuses. That is, FIG. 7 shows which status information ("class details" and "contents" will be referred to as "status information" in combination) shown in FIG. 5 influences the functions of the virtual devices shown in FIG. 6.

For example, an abnormal status "reader abnormality" of the physical device shown in FIG. 7 indicates that the scan function of the virtual device is disabled. Also, abnormal statuses "jam", "toner empty", "door open", and "sorter/finisher abnormality" of the physical devices indicate that the monochrome print function and color print function of the virtual devices are disabled. An abnormal status "FAX unsendable" of the physical device indicates that the FAX send function of the virtual device is disabled. An abnormal status "FAX-memory full" of the physical device indicates that the FAX reception function of the virtual device is disabled. Abnormal statuses "controller-disk full", "controller-HD error", and "memory-File count over" of the physical devices indicate that the BOX save function of the virtual device is disabled.

The status determination processing of the virtual device will be described below. FIG. 8 is a view for explaining the status determination processing of the virtual device. FIG. 8 shows how to determine the status of the virtual device VD1 depending on the states of the cooperating devices 103 (central MFP) and 104 (color MFP). "×" marks shown in FIG. 8 indicate that the devices 103 and 104 show abnormal statuses.

As described above, the virtual device VD1 cooperates the scan function of the device 104 and the FAX send function of the device 103. In respective cases shown in FIG. 8, places corresponding to the FAX send function of the device 103 and those corresponding to the scan function of the device 104 are indicated by bold frames.

In this embodiment, when "×" is shown in the place indicated by the bold frame, it indicates that the FAX send function to be implemented as the virtual device VD1 cannot be implemented. In this case, the status determination result of the virtual device VD1 is represented by "×", that is, it is determined that the virtual device is "abnormal: unusable". Conversely, when no "×" is shown in the place indicated by the bold frame, it indicates that the FAX send function can be implemented as the virtual device VD1. In this case, the status determination result of the virtual device VD1 is represented by "○", that is, it is determined that the virtual device VD1 is "normal: usable".

For example, in case 1, the device 103 is normal, but an abnormal status "toner empty" has occurred in the device 104. As can be seen from the "function—status correspondence information" shown in FIG. 7, this abnormal status influences the monochrome and color print functions. However, the device 104 has charge of neither the monochrome nor color print functions as the virtual device VD1. That is, the bold frame does not overlap the "×" mark in FIG. 8. Therefore, it is determined that the virtual device VD1 is normal ("○" mark).

In case 4, the device 103 is normal, but an abnormal status "reader abnormality" has occurred in the device 104. As can be seen from FIG. 7, this abnormal status influences the scan function. The device 104 has charge of the scan function as the virtual device VD1. That is, the bold frame overlaps the "×" mark in FIG. 8. Therefore, it is determined that the virtual device VD1 is abnormal ("×" mark).

Figure 9:
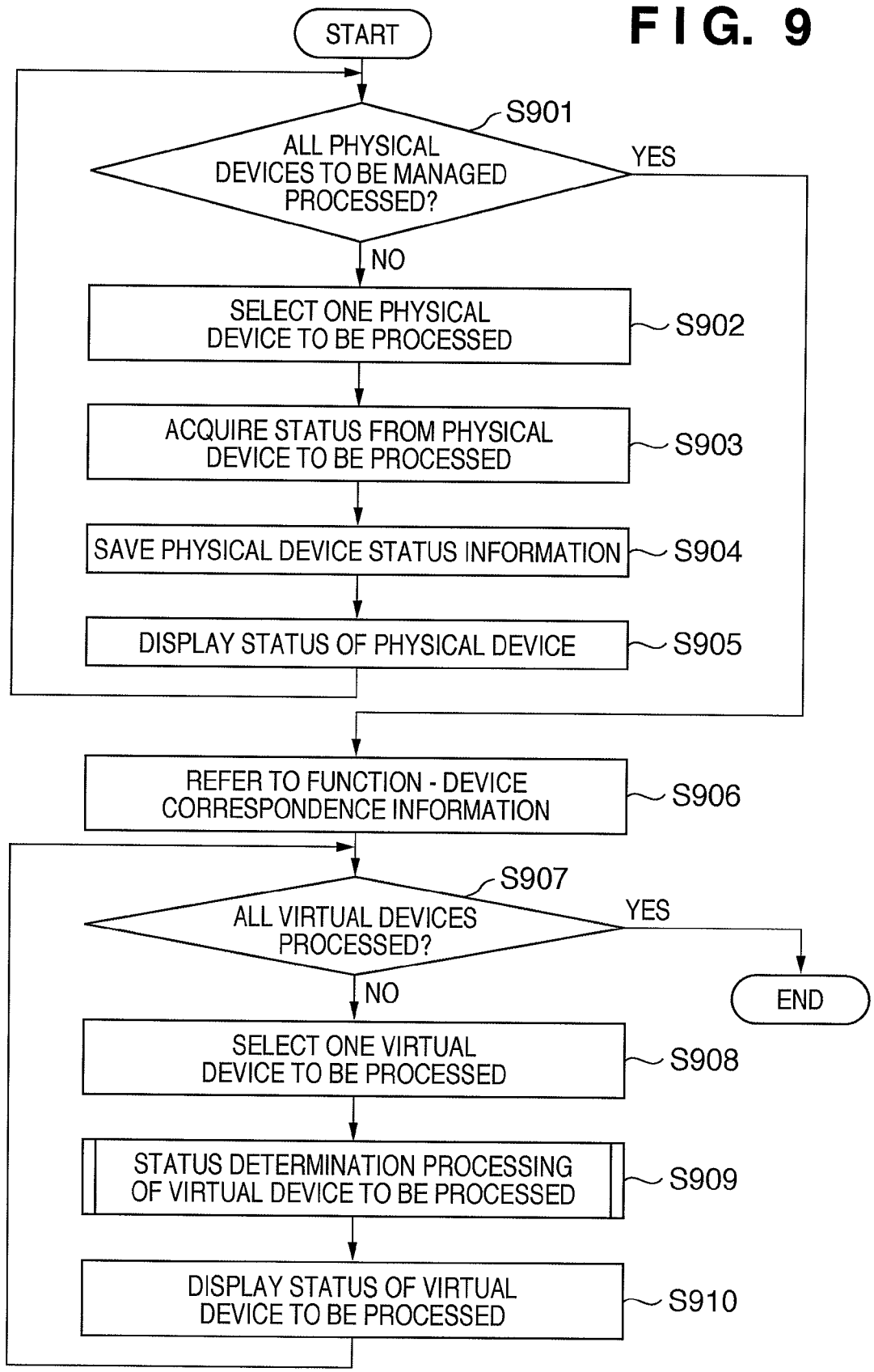
FIG. 9 is a flowchart showing the sequence of processing for displaying a list of the states of the physical devices and virtual devices under the management of the device management apparatus according to the embodiment of the present invention.

FIG. 9 is a flowchart showing the sequence of processing for displaying a list of the states of the physical devices and virtual devices under the management of the device management apparatus according to this embodiment. Note that a device which physically exists alone like the devices 103 to 107 shown in FIG. 1 is called "physical device". Also, a mode of setting a plurality of "physical devices" to execute processing in cooperation as if the plurality of physical devices were functioning as one device is called "virtual device".

It is checked in step S901 with reference to a list of the physical devices (devices 103 to 107) on the network 110, which list is held by the device management apparatus 101, if all the devices to be managed have been processed according to steps S902 to S905. If it is determined that devices to be processed still remain, the process advances to step S902.

In step S902, one device to be processed is selected from the physical device list. In step S903, a status is acquired from the physical device to be processed selected in step S902. For example, when "toner empty" and "jam" have occurred at the same time, all abnormal states that have occurred as the states of that device are acquired as statuses. If no abnormality occurs, a status "normal" may be acquired from the device, or return of no status may indicate that the device is normal.

In step S904, the status acquired in step S903 is stored in the device management apparatus 101 as status information of the physical device to be processed. In step S905, the status stored in step S904 is displayed on the display unit 208 shown in FIG. 2 as that of the physical device to be processed. The status is displayed as a device list window on the display unit 208. The device list window will be described later.

If it is determined in step S901 that all the physical devices have been processed, the process advances to step S906. In step S906, the device management apparatus 101 executes processes in steps S907 to S910 for respective virtual devices with reference to the "function—device correspondence information" shown in FIG. 6.

It is checked in step S907 if all the virtual devices in the "function—device correspondence information" have been processed according to steps S907 to S910. If it is determined that virtual devices to be processed still remain, one virtual device to be processed is selected in step S908, and the process advances to step S909.

In step S909, the status determination processing of the virtual device to be processed is executed. The status determination processing will be described later.

In step S910, the status of the virtual device to be processed is displayed on the display unit 208 shown in FIG. 2 based on the processing result in step S909. The status is displayed as the device list window on the display unit 208.

If it is determined in step S907 that all the virtual devices have been processed, the processing ends. In this case, the device list display is completed.

Figure 10:
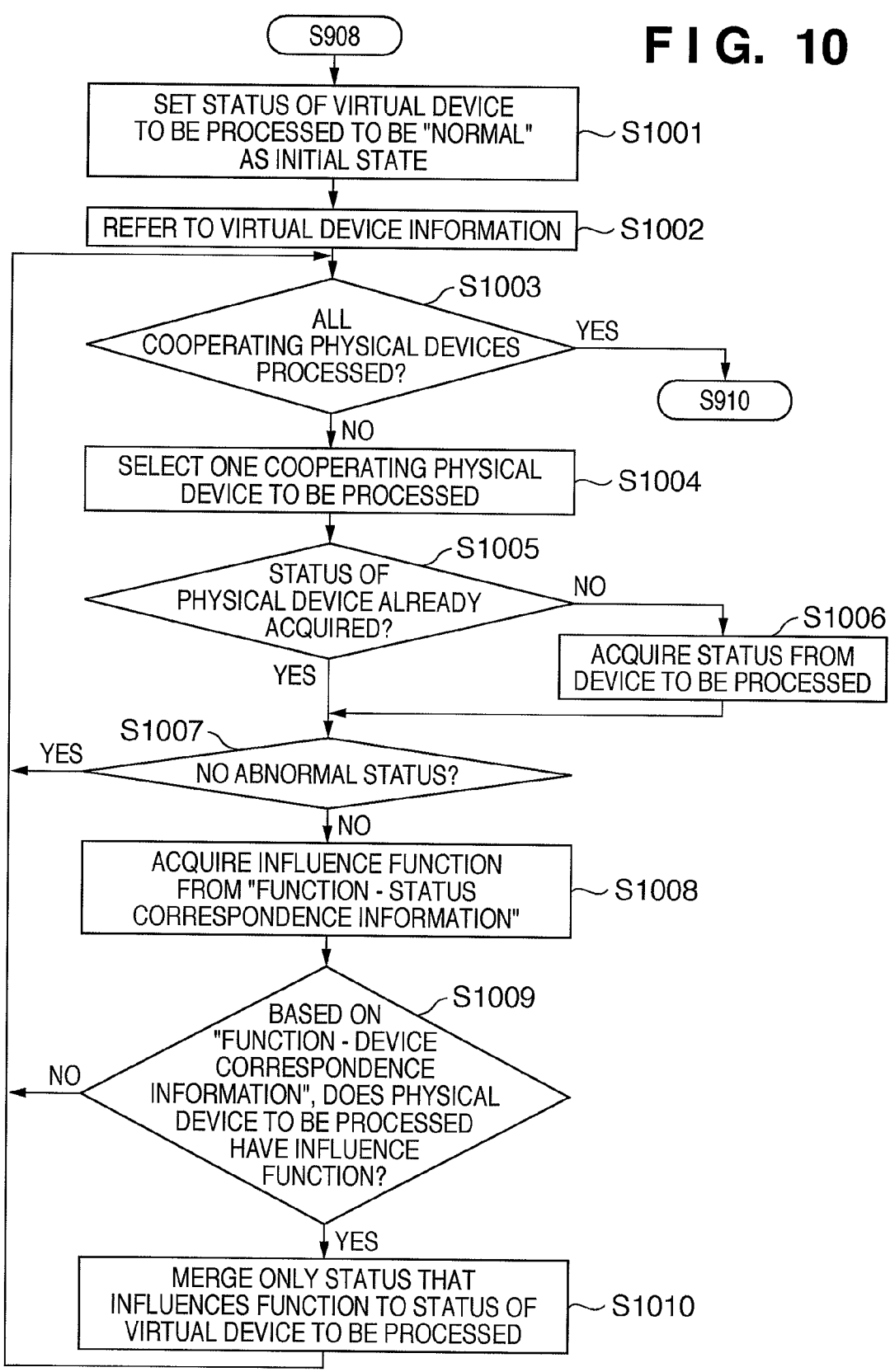
FIG. 10 is a flowchart showing the sequence of the status determination processing shown in FIG. 9.

The status determination processing in step S909 will be described below. FIG. 10 is a flowchart showing the sequence of the status determination processing shown in FIG. 9.

In step S1001, the status of the virtual device to be processed is set to be "normal" as an initial state. In step S1002, the "function—device correspondence information" shown in FIG. 6 is referred to so as to execute processes in steps S1003 to S1010 for each of the physical devices which cooperate in the virtual device to be processed.

It is checked in step S1003 if the physical devices to be processed of those which cooperate as the virtual device to be processed still remain. If it is determined that the physical devices to be processed still remain, the process advances to step S1004 to select one physical device to be processed.

It is checked in step S1005 if the status information of the physical device to be processed has already been acquired and saved in step S904. If it is determined that the status information of the physical device to be processed has not been acquired yet, the process advances to step S1006 to acquire the status from the physical device to be processed. On the other hand, if it is determined that the status information of the physical device to be processed has already been acquired, the status acquired and saved in step S904 is used in the processes in subsequent steps.

In step S1007, the status acquired and saved in step S904 or that acquired in step S1006 is analyzed to check if the status includes an abnormal status. If it is determined that no abnormal status is included, the process returns to step S1003. On the other hand, if it is determined that an abnormal status is included, the process advances to step S1008.

In step S1008, it is recognized based on the "function—status correspondence information" shown in FIG. 7 on which function of the virtual device the abnormal status confirmed in step S1007 imposes an influence. In this embodiment, the relationship between the functions of the virtual device and the abnormal statuses of the physical devices is presented as one system, as shown in FIG. 7. However, for example, when a device to be managed has a plurality of systems of status information, a plurality of pieces of "function—status correspondence information" may be used. In this case, for example, a system may be automatically determined based on a code appended to each status, and "function—status correspondence information" to be used may be switched based on that result. Even when the system to be used cannot be automatically determined based on the code of the status, "function—status correspondence information" to be used may be appropriately switched based on model information (product name or the like) of a device.

In step S1009, the function of the virtual device recognized in step S1008 is compared with that in charge by the physical device to be processed recognized with reference to the "function—device correspondence information". It is determined as a result of comparison if the abnormal status that has occurred in the physical device to be processed influences the function in charge by the virtual device to be processed. If it is determined that the abnormal status influences the function, the process advances to step S1010 to merge the status of the physical device to be processed as "abnormal state". In this case, when the status information of the virtual device to be processed is "normal", the abnormal status is merged after the status information "normal" is cleared, and the process returns to step S1003. On the other hand, if it is determined that the abnormal status does not influence the function, the process returns to step S1003 without any processing.

If the aforementioned determination has already been made and it is determined in step S1003 that the physical device to be processed of those which cooperate as the virtual device to be processed does not remain, the processing in FIG. 10 ends, and the process advances to step S910 shown in FIG. 9.

The device list window to be displayed on the display unit shown in FIG. 2 will be described below. FIG. 11 shows an example of the device list window displayed on the display unit 208 of the device management apparatus 101. As shown in FIG. 11, "device name" displays, as a device list, the devices 103 to 107 as the physical devices and the virtual devices VD1 to VD6. The contents of the "status" fields and "×" marks on icons of the physical devices in the leftmost column are displayed in step S905 shown in FIG. 9. The contents of the "status" fields are displayed based on the statuses acquired in step S904. On each icon, nothing is overwritten in case of a normal status. However, in case of an abnormal status, a "×" mark is displayed to indicate that the physical device of interest is in an abnormal state.

The contents of the "status" fields and "×" marks on icons of the virtual devices in the leftmost column are displayed in step S910 shown in FIG. 9. The content of each "status" field is displayed based on the status merged in step S1010. As a display method of the "status" field, for example, the acquired status itself like "Toner Empty" in FIG. 11 may be displayed. Alternatively, the contents obtained by freely translating the acquired status, and the acquired status itself may be displayed as a list like "unusable (Scan disabled/print disabled)" in FIG. 11.

As described above, in this embodiment, the state of each virtual device, i.e., whether the virtual device is usable or unusable is determined and displayed based only on the states of the physical devices which influences the functions used as the virtual device. As a result, the state of each virtual device can be expressed regardless of unnecessary abnormal statuses of the cooperating physical devices. Since whether or not each virtual device is usable (usable or unusable) is displayed, the user can determine the state of one virtual device.

In the configuration of FIG. 1, for example, the device 103 as the central MFP shown in FIG. 1 may create the "function—device correspondence information" indicating cooperating physical devices and the functions in charge by these devices. In this case, the device 103 acquires information of the cooperating physical devices, and executes the status determination processing of each virtual device and display unit control processing required to use that virtual device. That is, that device plays the role of the device management apparatus in the first embodiment. An embodiment in which the device 103 creates "function—device correspondence information" will be described below.

"Function—device correspondence information" shown in FIG. 6 is generated based on a user's cooperation instruction using the operation unit 312 and display unit 313, and the generated "function—device correspondence information" is saved in a storage unit such as the hard disk 311 or the like. Note that the device 103 may generate the "function—device correspondence information" by searching for physical devices on the network 110 to which the device 103 is connected and automatically cooperating the functions of the device 103 itself.

Figure 12:
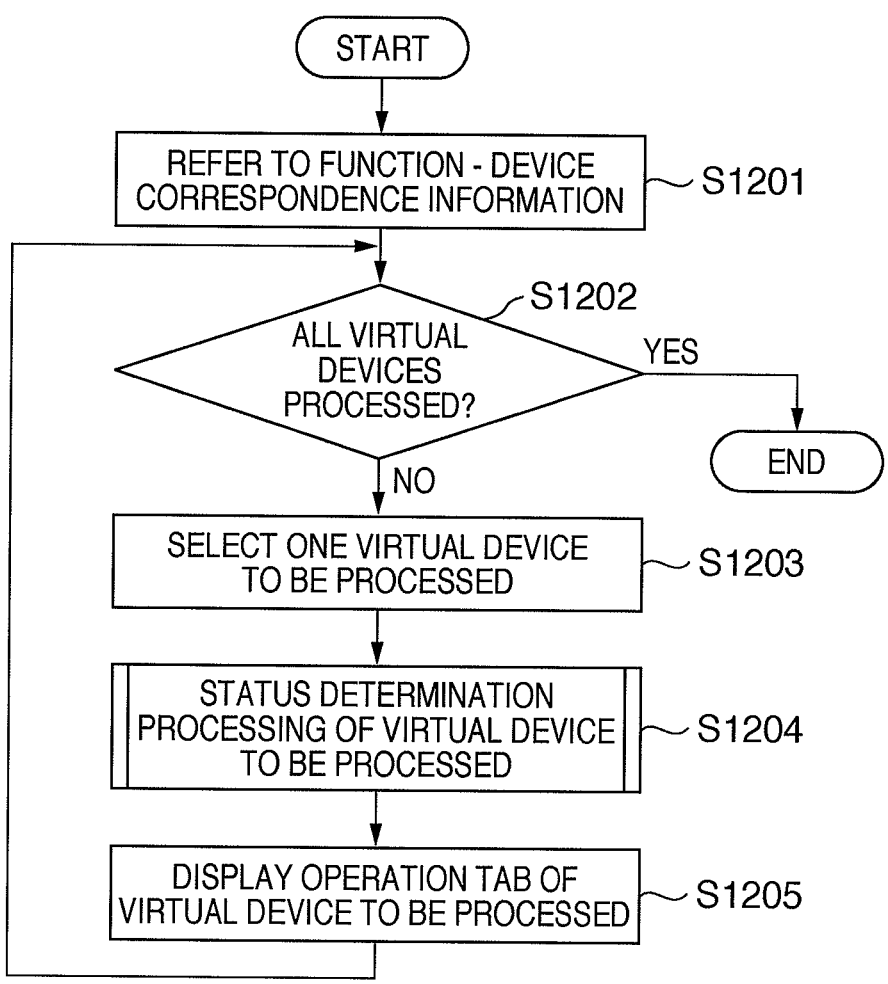
FIG. 12 is a flowchart showing the sequence of the status determination processing and display unit control processing of a virtual device on a device according to the second embodiment.

FIG. 12 is a flowchart showing the sequence of the status determination processing of the virtual device and the display unit control processing on the device 103 according to the second embodiment.

In step S1201, the "function—device correspondence information" shown in FIG. 6 is referred to so as to execute processes in steps S1202 to S1205 for each virtual device.

It is checked in step S1202 if virtual devices to be processed still remain. If it is determined that virtual devices to be processed still remain, the process advances to step S1203. In step S1203, one virtual device to be processed is selected.

In step S1204, status determination processing of the virtual device to be processed is executed. This processing is the same as in the description of FIG. 10. In step S1205, the display contents of an operation tab displayed on the display unit 313 are controlled based on the result of the status determination processing in step S1204. Note that the operation tab will be described later.

Figure 13:
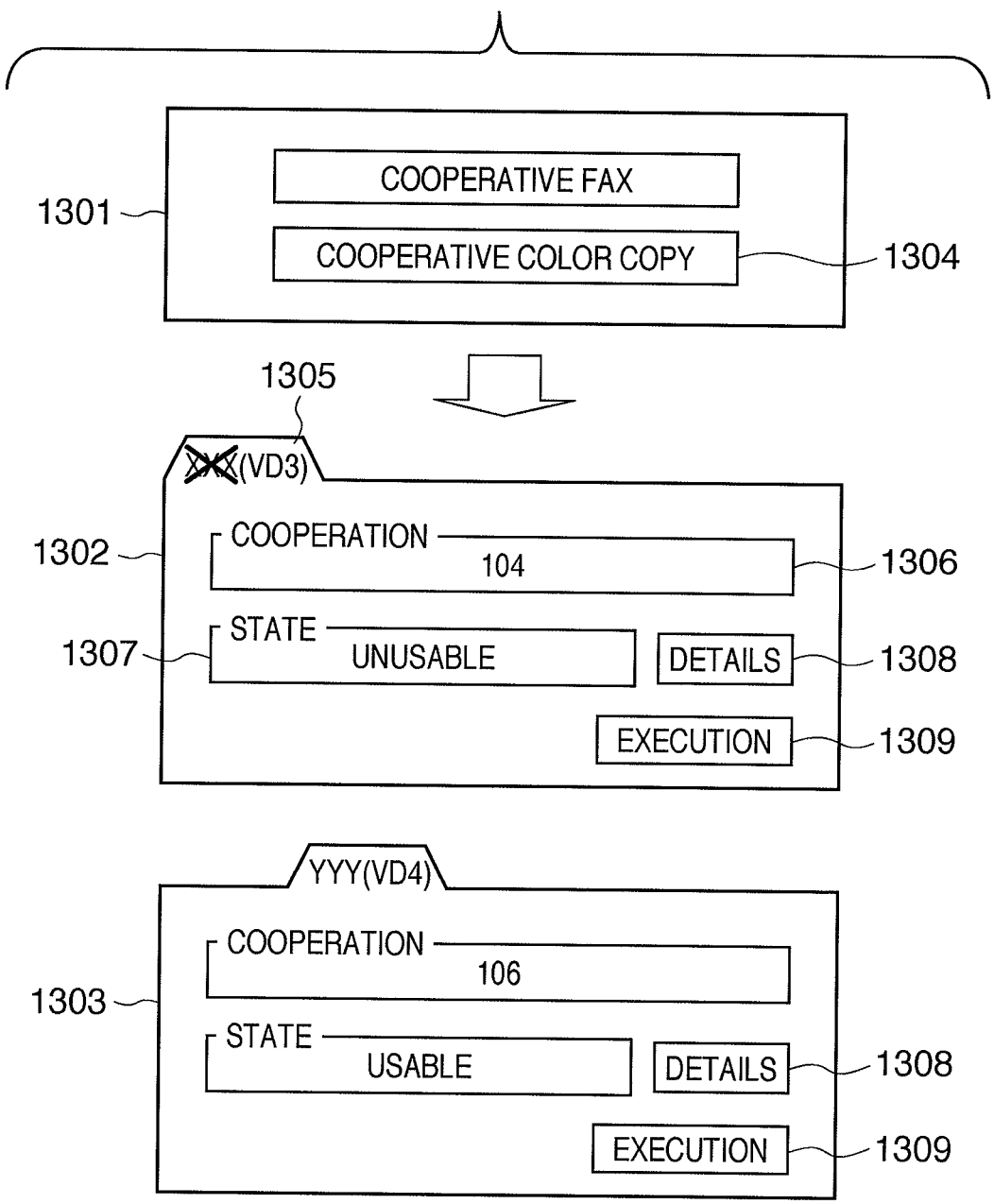
FIG. 13 is a view for explaining a window which is displayed on a display unit of the device, and is used upon using the virtual device.

FIG. 13 is a view for explaining a window which is displayed on the display unit 313 of the device 103, and is used upon using the virtual device. A window 1301 is used to select cooperative functions in use of the virtual device. As shown in FIG. 13, the window 1301 includes a "cooperative FAX" function and "cooperative color copy" (button 1304) function shown in FIG. 4.

Upon selection of the button 1304 indicating "cooperative color copy" on the window 1301, the window 1301 transits to a window that displays tabs 1302 and 1303. Note that the tabs 1302 and 1303 are displayed on the display unit 313 to overlap each other, so that one of these tabs is located on the front side to allow operations on the window. However, the two tabs are illustrated separately for the sake of simplicity.

The tab 1302 is used to instruct processing for the virtual device VD3. A display field 1306 displays the name of the device 104 as the color MFP, which cooperates with the device 103 on which this display is made, and has charge of the color print function. Taking FIG. 11 as an example, since the device 103 which has charge of the scan function in the virtual device VD3 suffers only an abnormal status "jam", the scan function is normal. However, since the device 104 which has charge of the color print function suffers "Toner Empty", the print function is abnormal. Upon execution of the processes shown in FIGS. 12 and 10 in this state, it is determined that the virtual device VD3 is abnormal, and "unusable" is displayed in a display field 1307. At the same time, on a display field 1305 that indicates the name of the virtual device, a "×" mark is displayed to allow the user to recognize at a glance that the virtual device is unusable even when the tabs are displayed to overlap each other. Furthermore, a button 1309 used to execute the cooperative function of the virtual device VD3 is grayed out, and is inhibited from being pressed. A button 1308 is used to display the state of each of cooperating devices on an independent window.

The tab 1303 is used to instruct processing for the virtual device VD4. The display field 1306 displays the name of the device 106 as the color printer, which cooperates with the device 103 on which this display is made, and has charge of the color print function. Taking FIG. 11 as an example, since the device 103 which has charge of the scan function in the virtual device VD4 suffers only an abnormal status "jam", the scan function is normal. Also, since the device 106 which has charge of the color print function is "normal", the print function is also normal. Upon execution of the processes shown in FIGS. 12 and 10 in this state, it is determined that the virtual device VD4 is normal, and "usable" is displayed in the display field 1307. At the same time, on the display field 1305 that indicates the name of the virtual device, no "×" mark is displayed to allow the user to recognize at a glance that the virtual device is usable even when the tabs are displayed to overlap each other. Furthermore, the button 1309 used to execute the cooperative function of the virtual device VD4 is normally displayed, and can be pressed. The button 1308 is used to display the state of each of cooperating devices on an independent window.

Figure 14A:
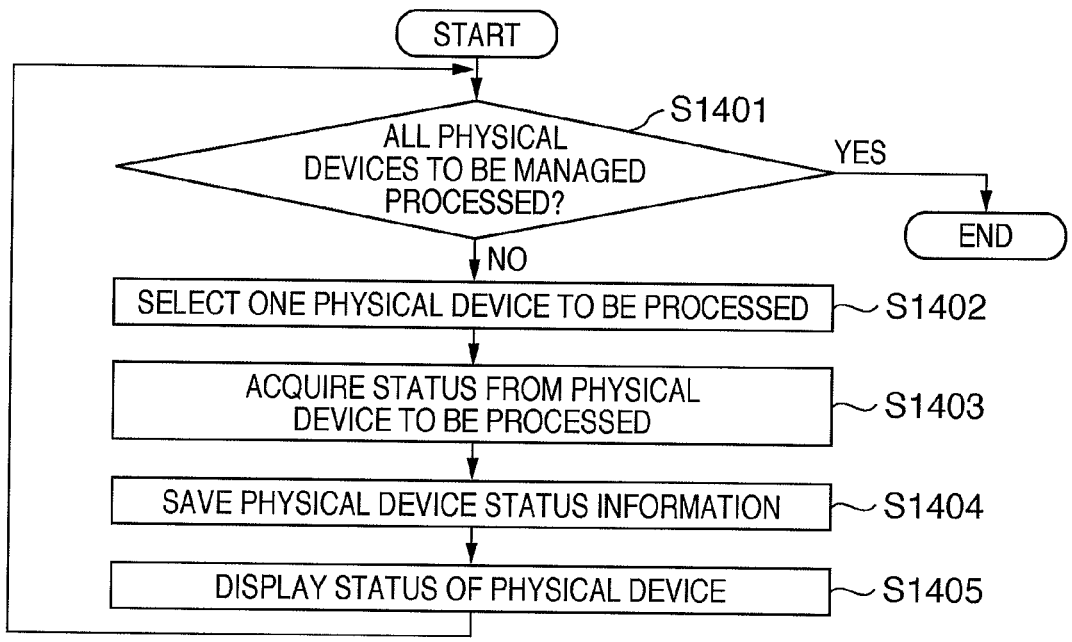
FIGS. 14A and 14B are flowcharts respectively showing the sequence of processing on a device management apparatus and that of processing on a device according to the third embodiment.
Figure 14B:
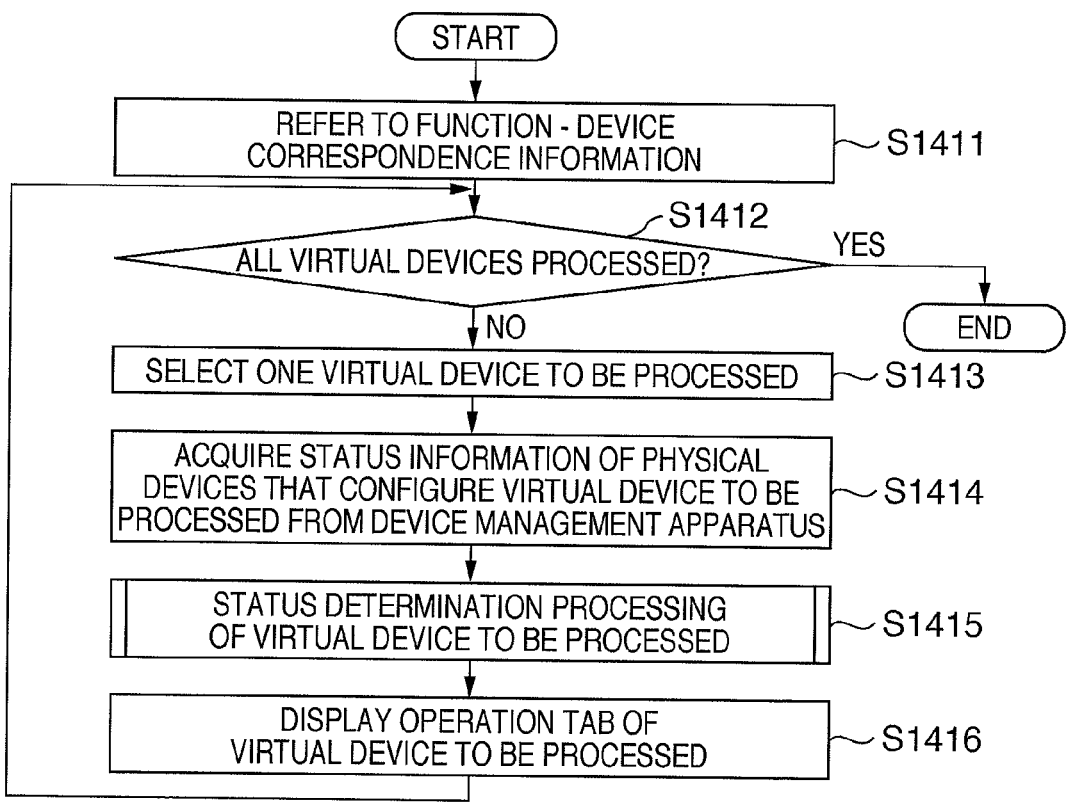

FIGS. 14A and 14B are flowcharts respectively showing the sequence of processing on the device management apparatus 101 and that of processing on the device 103 according to the third embodiment.

In this embodiment, in the environment shown in FIG. 1, the device 103 as the central MFP creates "function—device correspondence information" indicating the cooperating physical devices and the functions in charge by these devices. Furthermore, the device 103 acquires information of physical devices which cooperate with the device 103 itself from the device management apparatus 101, and executes status determination processing of virtual devices, and display unit control processing for use of the virtual devices.

It is checked in step S1401 with reference to a list of physical devices (i.e., devices 103 to 107) on the network 110, which list is held by the device management apparatus 101, if all the devices have been processed. If it is determined that physical devices to be processed still remain, the process advances to step S1402. In step S1402, one physical device to be processed is selected from the physical device list.

In step S1403, a status is acquired from the physical device to be processed selected in step S1402. When "toner empty" and "jam" have occurred at the same time, all abnormal states which have occurred as the states of that device can be acquired as statuses. If no abnormality occurs, a status "normal" may be acquired from the device, or return of no status may indicate that the device is normal.

In step S1404, the status acquired in step S1403 is stored as status information of the physical device to be processed. In step S1405, the status stored in step S1404 is displayed as the device list window shown in FIG. 11 on the display unit 208 as that of the physical device to be processed. If it is determined in step S1401 that all the physical devices have been processed, the processing ends.

In this embodiment, since the processing of the flowchart shown in FIG. 14A is periodically executed by the device management apparatus 101, the device management apparatus 101 can always hold the latest statuses of the physical devices.

On the other hand, upon displaying the tabs 1302 and 1303 used upon using the virtual devices shown in FIG. 13 on the display unit 313 of the device 103 as the central MFP, the processing of the flowchart shown in FIG. 14B is executed.

In step S1411, "function—device correspondence information" shown in FIG. 6 is referred to so as to execute processes in step S1412 to S1416 for respective virtual devices. It is checked in step S1412 if virtual devices to be processed still remain. If it is determined that virtual devices to be processed still remain, the process advances to step S1413. In step S1413, one virtual device to be processed is selected. In step S1414, status information of each of physical devices which configure the virtual device to be processed is acquired from the device management apparatus 101.

In step S1415, status determination processing of the virtual device to be processed is executed based on the status information of the physical devices acquired in step S1414. This processing is the same as the description of the flowchart shown in FIG. 10. In step S1416, the display contents of operation tabs (tabs 1302 and 1303 shown in FIG. 13) to be displayed on the display unit 313 are controlled based on the result of the status determination processing in step S1415.

The fourth embodiment will be described below. In this embodiment, degeneracy information is used in place of the status information that has already been described. In this embodiment, in the environment shown in FIG. 1, the device 103 creates "function—device correspondence information" indicating the cooperating physical devices and the functions in charge by these devices. Furthermore, the device 103 itself acquires information of cooperating physical devices, and executes display unit control processing for use of virtual devices.

FIG. 15 shows an example of degeneracy information in this embodiment. When any abnormality has occurred, a device can continue an operation by suspending some hardware components or functions of itself, and using the remaining hardware components or functions. Such operation is called a degeneracy operation, and information indicating the suspended hardware components or functions is called degeneracy information. In this embodiment, such degeneracy information can be acquired from each physical device. As shown in FIG. 15, each device can indicate "main body", "scanner unit", or "printer main body" as degeneracy information of a hardware component that cannot be used. Also, each device can indicate "function of token board", "function of resolution conversion board", "function of FAX board 1", or "function of FAX board 2" as degeneracy information of a function that cannot be used.

FIG. 16 shows the correspondence between the functions of virtual devices and the degeneracy information of physical devices. FIG. 16 shows which degeneracy information in FIG. 15 influences the functions of the virtual devices indicated by "function—device correspondence information". In this embodiment, for example, the device 103 as the central MFP holds this information.

As shown in FIG. 16, when "scanner unit" in a physical device is degeneracy, the scan function of a virtual device cannot be used. When "printer main body" is degeneracy, the monochrome and color print functions of a virtual device cannot be used. When "function of FAX board 1" and "function of FAX board 2" are degeneracy, the FAX send/reception function of a virtual device cannot be used. When "function of resolution conversion board" is degeneracy, the BOX save function of a virtual device cannot be used.

FIG. 17 is a flowchart showing the sequence of status determination processing of virtual devices and display unit control processing on the device 103. Note that this flowchart shows processes for only one virtual device. When there are plurality of virtual devices, this processing is repeated for respective virtual devices.

In step S1701, the status of the virtual device to be processed is set to be "usable" as an initial state. In step S1702, "function—device correspondence information" shown in FIG. 6 is referred to so as to execute processes in steps S1703 to S1708 for each of the cooperating physical devices.

It is checked in step S1703 if the physical devices to be processed still remain. If it is determined that the physical devices to be processed still remain, the process advances to step S1704 to select one physical device to be processed.

In step S1705, the function in charge by the physical device to be processed in the virtual device is obtained with reference to the "function—device correspondence information" shown in FIG. 6. Also, degeneracy information that influences the obtained function is obtained using "function—influence degeneracy information" shown in FIG. 16.

In step S1706, the degeneracy information obtained in step S1705 is acquired from the device. In a case in which the degeneracy information exists on the device as a list having the format shown in FIG. 15, that list is acquired. Since information indicating if each function of the device is degeneracy or usable may be held in some cases, only the degeneracy information obtained in step S1706 may be acquired from the device in such case.

It is checked in step S1707 based on the information acquired in step S1706 if the function in charge by the physical device to be processed is an unusable function. If it is determined that an unusable function is found, the process advances to step S1708. In step S1708, the unusable function is merged as the state of the virtual device to be processed. On the other hand, if it is determined that no unusable function is found, the process returns to step S1703. If it is determined in step S1703 that no physical device to be processed remains, the process advances to step S1709. In step S1709, a tab display like the tab 1302 or 1303 shown in FIG. 13 is made based on the information merged in step S1708.

Note that the case has been described in this embodiment wherein the degeneracy information is used. Alternatively, a device may have status information for each function, and may return "Yes" or "No" or detailed status information in response to an inquiry like "is FAX function normal?". In such case, an inquiry may be issued for the function in charge by each physical device using only the "function—device correspondence information" shown in FIG. 6.

As described above, in the embodiments of the present invention, the user can recognize which physical device has charge of each function of a virtual device by holding the "function—device correspondence information". Furthermore, the status information of each physical device is acquired, and whether or not the status information influences the function of the virtual device is checked, thereby extracting only abnormal states of physical devices that influence the function of the virtual device. In this embodiment, the state of the virtual device is determined based only on the abnormal states of the physical devices which influence the function of the virtual device, thereby displaying the virtual device state. As a result, the user of the virtual device can easily determine whether or not the function as the virtual device can be implemented, without being influenced by the abnormal states of the physical devices about the functions which are not used as the virtual device.

The present invention includes a case in which an operating system (OS) or the like which runs on a computer executes some or all actual processes based on an instruction of a program (device management program) code, thereby implementing the functions of the aforementioned embodiments. Furthermore, the present invention is also applied to a case in which a program code read out from a storage medium is written in a computer-readable memory equipped on a function expansion card or function expansion unit, which is inserted in or connected to a computer. In this case, a CPU or the like equipped on the function expansion card or unit executes some or all actual processes based on an instruction of the written program code, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-226697 filed Aug. 31, 2007, which is hereby incorporated by reference herein in its entirety.

What is claimed is:

1. A device management apparatus, which manages a virtual device that implements a cooperative function in which a plurality of physical devices connected via a network cooperate, comprising:

an acquisition unit adapted to acquire an abnormal status occurring in a function of a plurality of functions of each of the plurality of physical devices that implement the cooperative function; and a display unit adapted to display the abnormal status of the function acquired by the acquisition unit as a status of each of the physical devices and display virtual device information of whether or not the virtual device is usable based on the abnormal status acquired by the acquisition unit, and wherein said display unit displays that the virtual device is usable as the virtual device information when the cooperative function is able to be implemented by using functions which are different from the function which status is acquired as abnormal by the acquisition unit, of the plurality of functions of each of the plurality of physical devices constituting the virtual device, even if the abnormal status is displayed as the status of each of the physical devices by the display unit regarding all of the plurality of physical devices.

2. The apparatus according to claim 1, further comprising a first holding unit adapted to hold first correspondence information indicating correspondence between each of the plurality of physical devices, and a function of each of the physical devices that are necessary for the cooperative function, wherein the display unit displays that the virtual device is usable by determining if the abnormal status influences the cooperative function, based on the abnormal status acquired by the acquisition unit, and the first correspondence information held in the first holding unit.

3. The apparatus according to claim 2, wherein the function of the physical device includes at least one of a print function, a scan function, a FAX function and a BOX save function.

4. The apparatus according to claim 1, further comprising a second holding unit adapted to hold second correspondence information indicating correspondence between each of a plurality of functions that configure the cooperative function, and an abnormal status acquired from each of the plurality of physical devices, wherein the display unit displays that the virtual device is usable by determining on which a function of the plurality of functions that configure the cooperative function is imposed on an influence by the abnormal status of the function of the plurality of functions of each of the plurality of physical devices, based on the abnormal status acquired by the acquisition unit, and the second correspondence information held in the second holding unit.

5. A device management system including a device management apparatus according to claim 1, and a plurality of physical devices, which are connected via a network.

6. The apparatus according to claim 1, wherein the abnormal status of the physical device includes at least one of reader abnormality, sorter/finisher abnormality, FAX-memory full and HD (Hard Disk) error.

7. A device management method, which manages a virtual device that implements a cooperative function in which a plurality of physical devices connected via a network cooperate, comprising:

an acquisition step of acquiring an abnormal status occurring in a function of a plurality of functions of each of the plurality of physical devices that implement the cooperative function; and a display step of displaying the abnormal status of the function acquired in the acquisition step as a status of each of the plurality of physical devices and displaying virtual device information of whether or not the virtual device is usable based on the abnormal status acquired in the acquisition step, and wherein, said display step displays that the virtual device is usable as the virtual device information when the cooperative function is able to be implemented by using functions which are different from the function which status is acquired as abnormal in the acquisition step, of the plurality of functions of each of the plurality of physical devices constituting the virtual device, even if the abnormal status is displayed as the status of each of the physical devices in the display step regarding all of the plurality of physical devices.

8. The method according to claim 7, wherein in the display step, what the virtual device is usable is displayed by determining if the abnormal influences the cooperative function, based on the abnormal status acquired in the acquisition step, and first correspondence information indicating correspondence between each of the plurality of physical devices, and each of a plurality of functions that are necessary for the cooperative function.

9. The method according to claim 7, wherein in the display step, what the virtual device is usable is displayed by determining on which a function of the plurality of functions that configure the cooperative function is imposed on an influence by the abnormal status of the function of the plurality of functions of each of the plurality of physical devices, based on the abnormal status acquired in the acquisition step, and second correspondence information indicating correspondence between each of a plurality of functions that configure the cooperative function and an abnormal status acquired from each of the plurality of physical devices.

10. The method according to claim 7, wherein the abnormal status of the physical device includes at least one of reader abnormality, sorter/finisher abnormality, FAX-memory full and HD (Hard Disk) error.

11. A non-transitory computer-readable storage medium storing a device management processor-executable program code executed by a device management apparatus, which manages a virtual device that implements a cooperative function-in which a plurality of physical devices connected via a network cooperate, the device management program making the device management apparatus function to:

acquire an abnormal status of a function occurring in a plurality of functions of each of the plurality of physical devices that implement the cooperative function; and display the acquired abnormal status of the function as a status of each of the plurality of physical devices and display virtual device information of whether or not the virtual device is usable based on the acquired abnormal status, and wherein, it is displayed that the virtual device is usable as the virtual device information when the cooperative function is able to be implemented by using functions which are different from the function which status is acquired as abnormal, of the plurality of functions of each of the plurality of physical devices constituting the virtual device, even if the abnormal status is displayed as the status of each of the physical devices regarding all of the plurality of physical devices.

12. The non-transitory computer-readable storage medium according to claim 11, wherein the device management program displays that the virtual device is usable by determining if the abnormal status influences the cooperative function, based on the acquired, status and first correspondence information indicating correspondence between each of the plurality of physical devices, and each of a plurality of functions that are necessary for the cooperative function.

13. The non-transitory computer-readable storage medium according to claim 11, wherein the device management program displays that the virtual device is usable by determining on which a function of the plurality of functions that configure the cooperative function is imposed on an influence by the abnormal status of the function of the plurality of functions of each of the plurality of physical devices, based on the acquired status, and second correspondence information indicating correspondence between each of a plurality of functions that configure the cooperative function and an abnormal status acquired from each of the plurality of physical devices.

14. The non-transitory computer-readable storage medium according to claim 11, wherein the abnormal status of the physical device includes at least one of reader abnormality, sorter/finisher abnormality, FAX-memory full and HD (Hard Disk) error.

* * * * *